July 26, 1960     H. E. LEMONT, JR     2,946,391
ROTOR BLADE FLAPPING CONTROL MECHANISM Filed Dec. 29, 1955     2 Sheets-Sheet 1

INVENTOR.
Harold E. Lemont, Jr.
BY
ATTORNEY

July 26, 1960

H. E. LEMONT, JR 2,946,391

ROTOR BLADE FLAPPING CONTROL MECHANISM

Filed Dec. 29, 1955

INVENTOR.
Harold E. Lemont Jr.
BY
ATTORNEY

United States Patent Office 2,946,391
Patented July 26, 1960

2,946,391

ROTOR BLADE FLAPPING CONTROL MECHANISM

Harold E. Lemont, Jr., Pottstown, Pa., assignor, by mesne assignments, to Boeing Airplane Company, Seattle, Wash., a corporation of Delaware Filed Dec. 29, 1955, Ser. No. 556,252

10 Claims. (Cl. 170—160.55)

This invention relates to rotary wing aircraft and more particularly to means for restraining flapping of the rotor blades under certain operating conditions.

In the operation of rotary wing aircraft employing articulated rotors, oscillation of the blades about the horizontal pin, usually referred to as blade flapping, may reach excessive proportions when the rotational speed of the rotor is below a predetermined critical r.p.m. This excessive flapping, caused by gusts of wind, may result in damage to the blades and to other parts of the aircraft. To prevent such damage, it is necessary to restrain the blades from flapping under these operating conditions. However, when the aircraft is in flight and the rotational speed of the rotor is above the predetermined critical r.p.m., the centrifugal forces acting on the blades prevent excessive flapping, and to permit the blades to assume a position determined by the aerodynamic and centrifugal forces acting thereon, the flapping motion of the blade must be unrestrained.

Accordingly, it is an object of this invention to provide means for restraining the rotor blades of a rotary wing aircraft from flapping when the rotor is stationary or operating below a predetermined critical rotational speed, and permitting unrestrained flapping of the blades when the rotor is operating above said critical speed.

Another object is to provide means which automatically serve to limit blade flapping when the rotational speed of the rotor is below a predetermined critical r.p.m. and which automatically serve to permit unrestrained blade flapping when the rotational speed of the rotor is above said predetermined critical r.p.m.

A further object is to provide means interconnecting the rotor blade with means rotatable with the rotor hub and provided with means responsive to the rotational speed of the rotor for positioning the interconnecting means between flap restraining and unlocked positions.

Prior to the present invention, two-link toggle connections between the rotor hub and the blades have been used to lock the blade against flapping when the rotor is operating below a predetermined critical speed. These toggle connections have been provided with a weight secured to one of the links and with spring means which in conjunction with the weight cause locking and unlocking of the linkage in response to the rotational speed of the rotor. The disadvantage of such device is that when the centrifugal force acting upon the weight moves the linkage to unlocked position, the flapping position of the blade is concurrently affected. The flapping position of the blade is therefore directly related to the position of the weight and the linkage to which it is secured and to the force of the associated spring means, and the flapping of the blade is therefore not unrestrained.

It is an object of the present invention to overcome the disadvantages of the prior toggle joint devices by including within a toggle joint, means which permit unrestrained flapping of the blade when the toggle joint is in unlocked position.

Other objects and advantages will become apparent from the following description when read in conjunction with the accompanying drawings, in which.

Figure 1:
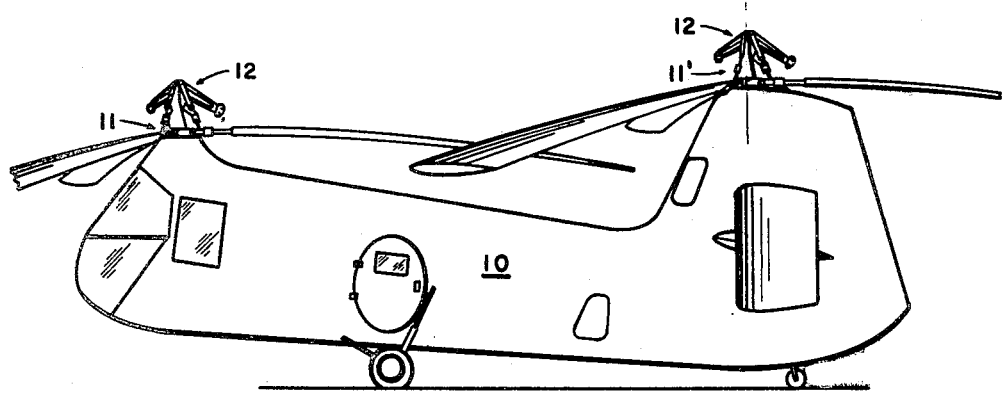
Fig. 1 is a side elevation of a helicopter equipped with the flapping control mechanism of this invention.

As shown in Fig. 1, a tandem rotor helicopter has a fuselage 10 supported by a main landing gear and a tail wheel. The fuselage has a forward sustaining rotor 11 and an aft sustaining rotor 11'. On the hub of the sustaining rotors is mounted the flapping control mechanism 12 of this invention.

Figure 2:
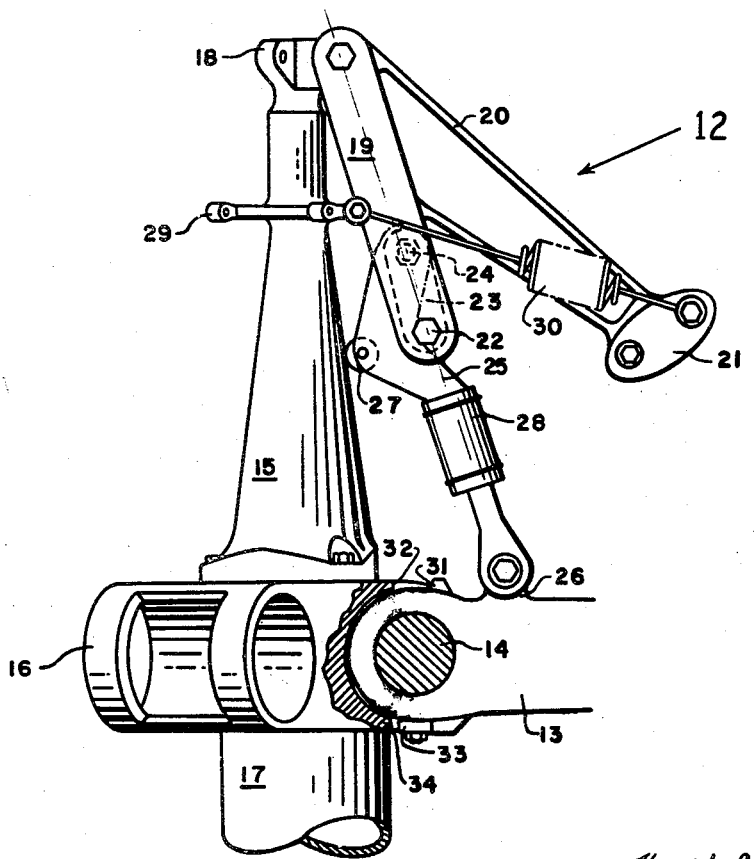
Fig. 2 is an enlarged view of the rotor head illustrating the mechanism in the flap restraining position.
Figure 4:
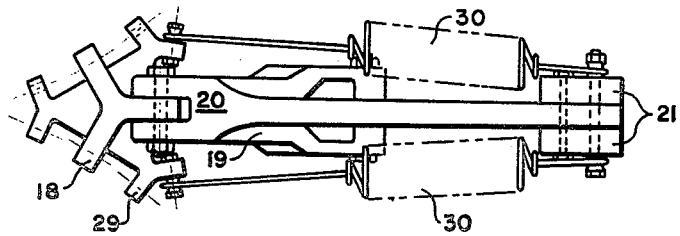
Fig. 4 is a plan view of Fig. 3.
Figure 3:
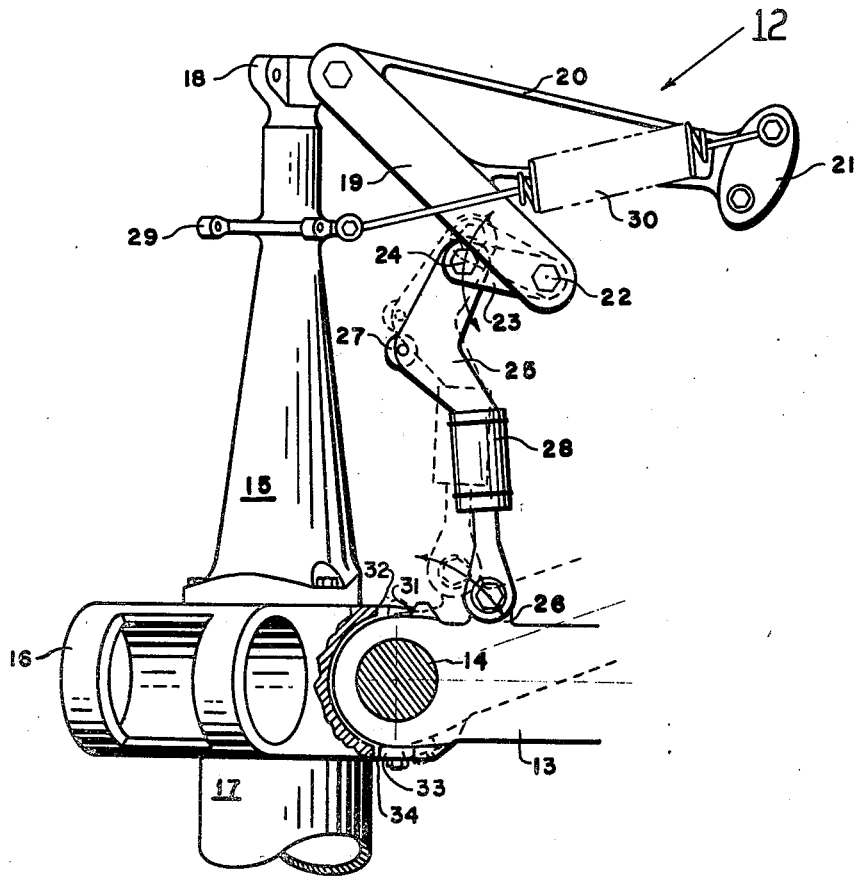
Fig. 3 shows the mechanism of Fig. 2 in the unlocked position and in dotted lines shows the relative position of the linkage when the blade is subjected to upward flapping.

Referring to Figs. 2 and 3, the flapping control mechanism 12 is a spring-biased centrifugally operated device designed to restrain blade flapping when the rotor is at rest or operating below a predetermined critical rotational speed. The mechanism consists essentially of three linkages forming an over-center locking arrangement or toggle joint for restraining the blade flapping link 13 against oscillation about the flapping hinge 14.

A rotor hub mast 15 is mounted on the rotor hub 16 which is rigidly connected to the hollow rotor shaft 17 for rotation therewith. On top of the mast 15 and integral therewith are lugs 18 to which a link 19 and an arm 20 integral therewith, is pivotally connected. The arm 20 is provided with weights 21, while pivotally connected to link 19 at 22 is an intermediate link 23 which in turn is pivotally connected at 24 to a lower link 25. Lower link 25 is pivotally connected to an attaching lug 26 on the blade flapping link 13 and is provided with a roller 27 which abuts against the mast 15 to limit counterclockwise movement of the link 25. Incorporated within the link 25 is a restrainer or damper 28 which restrains the flapping motion of the blade when the flapping control mechanism is in the position shown in Fig. 2. Details of this restrainer are not shown as it may be of any well known construction as shown in United States Patent No. 2,595,642.

Slightly below the top of mast 15 and rigidly connected thereto are lugs 29 to which one end of two springs 30 are attached. The opposite end of the springs 30 are connected to the weight carrying arm 20 for opposing the centrifugal force acting on the weights 21.

When the rotational speed of the rotor is below a predetermined critical r.p.m. the tension force of the springs 30 holds the weight carrying arm 20 down, thus maintaining the linkage in the over-center locked position as shown in Fig. 2 wherein the restrainer 28 is effective to restrict or restrain the vertical lift and fall of the blades. As the rotational speed of the rotor increases beyond the predetermined critical r.p.m., the centrifugal force acting on the weights 21 overcomes the tension force of the springs 30 and causes the weights 21 to move outwardly, thus rotating the arm 20 and the link 19 integral therewith in a counterclockwise direction and causing the link 19 to pass over-center to the unlocked position as shown in Fig. 3. When in this position, the restrainer 28 is no longer effective and the flapping motion of the blade causes oscillation of the intermediate link 23 about the pivotal connection 22. This motion has little or no effect on the position of link 19 and the weight carrying arm 20. Conversely, the centrifugal force acting on the weights 21 to move the arm 20 and link 19 therewith, has little or no effect upon the flapping motion of the blade.

As the rotor slows down to a rotational speed below the predetermined critical r.p.m., the tension force of the two springs 30 attached to the arm 20 overcomes the centrifugal force acting upon the weights 21 and causes clockwise rotation of arm 20 and the link 19 therewith until the linkage again occupies the over-center flap restraining position shown in Fig. 2.

Although unrestrained blade flapping is desired when the rotational speed of the rotor is above the predetermined critical r.p.m., the extreme limit of blade motion about the flapping hinge 14 is controlled by flap and droop stops. The upward flapping movement of the blade is limited by a flap stop 31 provided on the flapping link 13 and engaging an abutment 32 of the rotor hub 16, while downward flapping is limited by a droop stop 33 engaging a lower abutment 34 of the rotor hub.

Although shown and described in what is believed to be the most practical and preferred embodiment, it is apparent that departures from the specific apparatus shown will suggest themselves to those skilled in the art and may be made without departing from the spirit and scope of the invention. I therefore do not wish to restrict myself to the particular form of construction illustrated and described, but desire to avail myself of all modifications that may fall within the scope of the appended claims.

Having thus described my invention, what I claim is:

1. In a rotary wing aircraft having a rotor including a hub and at least one blade pivotally attached to said hub for flapping movement, a blade flapping control mechanism comprising structure carried by and rotatable with said hub, a first link pivotally connected to said structure, a second link pivotally connected to said blade, and an intermediate link pivotally connected to said first and said second links, said links being so arranged in an over-center locked position to maintain said blade in a position substantially at right angles to the axis of said hub when the rotational speed of said rotor is below a predetermined critical r.p.m.

2. In a rotary wing aircraft having a rotor including a hub and at least one blade pivotally attached to said hub for flapping movement, a blade flapping control mechanism comprising structure carried by and rotatable with said hub, a first link pivotally connected to said structure, a second link pivotally connected to said blade, an intermediate link pivotally connected to said first and said second links, said links being so arranged in an over-center locked position to maintain said blade in a position substantially at right angles to the axis of said hub, and means associated with said links and responsive to the rotational speed of said rotor for positioning said links such that the flapping movement of said blade is unrestrained.

3. In a rotary wing aircraft having a rotor including a hub and at least one blade pivotally attached to said hub for flapping movement, a blade flapping control mechanism comprising structure carried by and rotatable with said hub, means for restraining blade flapping when the rotational speed of said rotor is below a predetermined critical r.p.m., said restraining means including a toggle comprising three links arranged in an over-center locked position interconnecting said structure and said blade and including damper means contained within one of said links, and spring means connected to said structure and to a second of said links connected to said structure for maintaining said toggle in a flap restraining position.

4. In a rotary wing aircraft having a rotor including a hub and at least one blade pivotally attached to said hub for flapping movement, a blade flapping control mechanism comprising structure carried by and rotatable with said hub, a first link pivotally connected to said structure, a second link pivotally connected to said blade, an intermediate link pivotally connected to said first and said second links, spring means associated with said links for maintaining said first and said second links in over-center locked position when the rotational speed of said rotor is below a predetermined critical r.p.m., means contained within one of said links for restraining blade flapping when said links are in said locked position, and means associated with said links and responsive to the rotational speed of said rotor for positioning said first link to unlocked position when the rotational speed of said rotor is above said predetermined critical r.p.m.

5. In a rotary wing aircraft having a rotor including a hub and at least one blade pivotally attached to said hub for flapping movement, a blade flapping control mechanism comprising structure carried by and rotatable with said hub, a first link pivotally connected to said structure, a second link pivotally connected to said blade, an intermediate link interconnecting said first and said second links, a spring connected to said structure and to said first link for maintaining said first and said second links in an over-center locked position, means contained within said second link for restraining flapping movement of said blade when said links are in said locked position, an arm integral with said first link and provided with a weight responsive to the rotational speed of said rotor, said weight causing rotation of said first link to move said first link to unlocked position.

6. In a rotary wing aircraft having a rotor including a hub and at least one blade pivotally attached to said hub for flapping movement, a blade flapping control mechanism comprising structure carried by and rotatable with said hub, a first link pivotally connected to said structure, a second link pivotally connected to said blade, an intermediate link interconnecting said first and said second links, a spring connected to said structure and to said first link for maintaining said first and said second links in an over-center locked position, means contained within said second link for restraining flapping movement of said blade when said links are in said locked position, and means carried by said first link and responsive to the rotational speed of said rotor for rotating to unlocked position said first link about its pivotal connection to said structure.

7. In a rotary wing aircraft having a rotor including a hub and at least one blade pivotally attached to said hub for flapping movement, a blade flapping control mechanism comprising structure carried by and rotatable with said hub, a first link pivotally connected to said structure, a second link pivotally connected to said blade, an intermediate link pivotally connected to said first and said second links, spring means associated with said links for maintaining said first and said second links in over-center locked position when the rotational speed of said rotor is below a predetermined critical r.p.m., and means contained within one of said links for restraining blade flapping when said links are in locked position.

8. The combination of claim 7 wherein said flap restraining means is contained within said second link.

9. The combination of claim 7 wherein said spring means are connected to said structure and to said first link.

10. The combination of claim 4 wherein said rotational speed responsive means are integral with said first link.

References Cited in the file of this patent
UNITED STATES PATENTS

| | | |
|---|---|---|
| 2,628,686 | Buivid | Feb. 17, 1953 |
| 2,719,593 | Alex | Oct. 4, 1955 |